US007942341B2

(12) United States Patent
Ao et al.

(10) Patent No.: US 7,942,341 B2
(45) Date of Patent: May 17, 2011

(54) TWO DIMENSIONAL DOT CODE, AND DECODING APPARATUS AND METHOD FOR A TWO DIMENSIONAL DOT CODE

(75) Inventors: Chen-Hua Ao, Taichung County (TW); Yi-Hsin Tao, Hsinchu (TW); Cheng-Ru Chang, Taipei (TW)

(73) Assignee: Elan Microelectronics Corporation, Hsinchu (TW)

( * ) Notice: Subject to any disclaimer, the term of this patent is extended or adjusted under 35 U.S.C. 154(b) by 378 days.

(21) Appl. No.: 12/168,079

(22) Filed: Jul. 4, 2008

(65) Prior Publication Data
US 2009/0302114 A1 Dec. 10, 2009

(30) Foreign Application Priority Data

Jun. 6, 2008 (TW) ................................ 97121151 A

(51) Int. Cl.
*G06K 19/06* (2006.01)
(52) U.S. Cl. ........................................ 235/494; 235/454
(58) Field of Classification Search .................. 235/494, 235/454, 460, 462.09
See application file for complete search history.

(56) References Cited

U.S. PATENT DOCUMENTS

| 2007/0199990 | A1* | 8/2007 | Sonoda ........................ 235/454 |
| 2008/0048044 | A1* | 2/2008 | Zhao et al. .................... 235/494 |
| 2009/0066977 | A1* | 3/2009 | Yoshida ....................... 358/1.8 |
| 2009/0224054 | A1* | 9/2009 | Wei et al. ..................... 235/470 |

* cited by examiner

*Primary Examiner* — Edwyn Labaze
(74) *Attorney, Agent, or Firm* — Rosenberg, Klein & Lee

(57) ABSTRACT

A two dimensional dot code includes boundary dots, a direction dot and a code dot to regenerate an information therefrom. To decode the two dimensional dot code, the boundary dots and the direction dot are used to define coordinates of virtual code dots first and then, the code dot is compared with the coordinates of the virtual code dots. Thus, in order to retrieve the information represented by the two dimensional dot code, the position of the code dot can be rapidly determined without rotational correction of the image taken from the two dimensional dot code.

13 Claims, 8 Drawing Sheets

TWO DIMENSIONAL DOT CODE, AND DECODING APPARATUS AND METHOD FOR A TWO DIMENSIONAL DOT CODE

FIELD OF THE INVENTION

The present invention is related generally to a graphical digital cod and, more particularly, to a two dimensional dot code.

BACKGROUND OF THE INVENTION

A two dimensional dot code is a printed dot pattern encoded under specific rules for reproducing specific information. Nowadays, two dimensional dot codes are often used in teaching materials, for example in English teaching materials for children. In these teaching materials, behind clearly printed main characters, relatively small and inconspicuous two dimensional dot codes are printed as the background of the main characters. A user reading the main characters can simultaneously scan the two dimensional dot codes in the background with an optical reader and thereby input the two dimensional dot codes into a computer or other devices, which decodes the two dimensional dot codes and outputs corresponding information to make strong impression of the main characters on the user. For instance, a two dimensional dot code read from the background of a main character of the English letter A may result in playback of an audio file containing the pronunciation of the letter A, or playback of a video file related to the letter A, such as one showing an apple falling from a tree.

Generally, a block of two dimensional dot code is composed of boundary dots, direction dots and code dots. To decode a two dimensional dot code, an optical reader is used to scan the two dimensional dot code to input an image into a decoding apparatus, for example a computer. Each commercial company defines its own encoding rules, and thereby produces unique two dimensional dot codes in terms of positioning method, code dot distribution and code capacity. For instance, Taiwan Pat. No. 581,970 issued to Sonix Technology Co., Ltd. discloses a two dimensional dot code, in which boundary dots (a header group) arranged in an L shape define the range and direction of a two dimensional dot code, so that information represented by the block of two dimensional dot code can be deciphered according to the positions of code dots in the block of two dimensional dot code. U.S. Pat. No. 6,548,768 issued to Pettersson et al. teaches a two dimensional dot code having no specific boundary dots. Instead, two code dots having the shortest spacing therebetween is first found out, virtual grid lines are plotted based on the two code dots to further define the dimensions of virtual grid cells, and finally a range of a block of two dimensional dot code is simulated to facilitate decoding. Presently, the maximum code capacity of a two dimensional dot code is $2^{32}$, made by encoding rules proposed by PixArt Imaging Inc.

Although encoding rules vary from company to company, decoding a two dimensional dot-code always begins with determining an angular difference between a scanned image of the two dimensional dot code and a preset direction according to boundary and direction dots because the scanned image is often skewed. Only when the scanned image of the two dimensional dot code is rotationally corrected can information represented by the two dimensional dot code be determined according to the positions of code dots, before performing the action corresponding to the information. However, calculation of an image rotation is complicated and susceptible to misjudgment because not only are sine and cosine operations involved, but also the farther a code dot is from the center of rotation, the greater the error.

SUMMARY OF THE INVENTION

An object of the present invention is to provide a two dimensional dot code.

Another object of the present invention is to provide an encoding and decoding method for a two dimensional dot code.

Still another object of the present invention is to provide a decoding apparatus for a two dimensional dot code.

Yet another object of the present invention is to provide a medium device having a decoding software for a two dimensional dot code.

According to the present invention, a two dimensional dot code includes several boundary dots, a direction dot and one or more code dots. The code dots are distributed in a 3×3 array of virtual units in one of virtual grid cells simulated according to the boundary dots and the direction dot, or located on the virtual partitioning lines of the virtual grid units. To decode such two dimensional dot code, the boundary dots and the direction dot are used to define coordinates of several virtual grid points, then coordinates of several virtual code dots are calculated from the coordinates of the virtual grid points, and finally the code dot is compared with the coordinates of the virtual code dots to rapidly determine a position of the code dot and obtain the information intended to be regenerated from the twos dimensional dot code.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
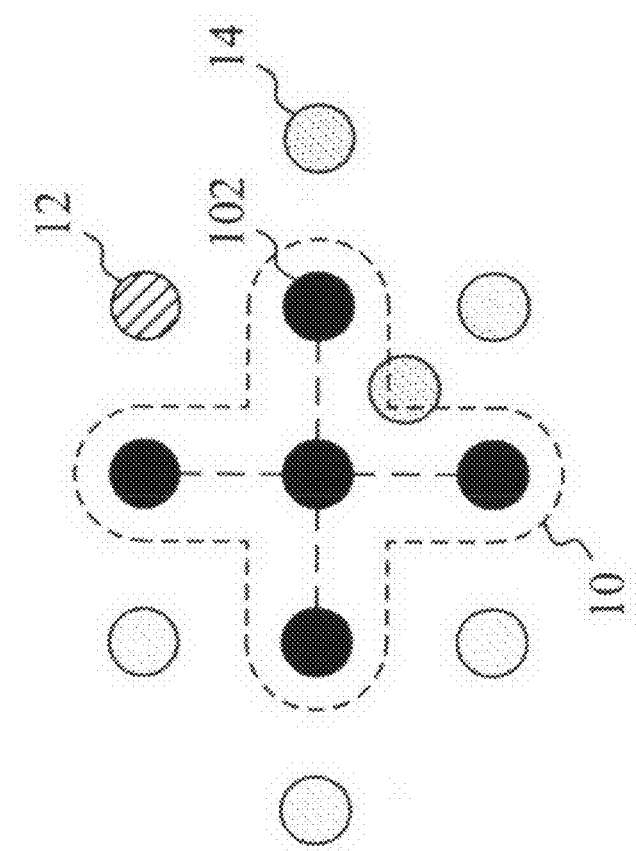
FIG. 1 is a schematic drawing of boundary dots and a direction dot in an embodiment according to the present invention.
Figure 2:
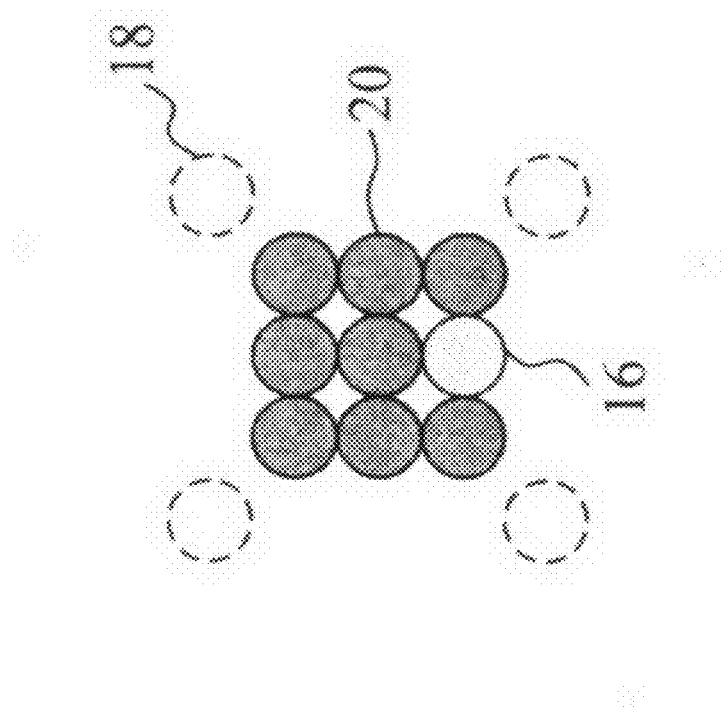
FIG. 2 is a schematic drawing of a code dot in an embodiment according to the present invention.

FIG. 1 is a schematic drawing of boundary dots and a direction dot in an embodiment according to the present invention, in which five boundary dots 102 arranged as a cross 10 having two orthogonal bars, and a direction dot 12 serves to facilitate determination of the direction of a two dimensional dot code containing the boundary dots 102 and the direction dot 12. While the direction dot 12 is defined at an upper right corner of the cross 10 in this embodiment, it may be defined elsewhere in other embodiments to coincide with any one of points 14, for instance, provided that a fixed positional relationship is formed between the direction dot 12 and the cross 10 made of the boundary dots 102 to allow acquisition of current directional information of the two dimensional dot code when this two dimensional dot code is read. Once the direction of such two dimensional dot code is known, several virtual grid points extending in all directions from the boundary dots 102 are calculated according to the positional relationship among the boundary dots 102. FIG. 2 is a schematic drawing of a code dot in an embodiment according to the present invention, in which virtual grid points 18 are simulated according to the boundary dots 102, four such virtual grid points 18 together form a virtual grid cell, and virtual code dots 20 are distributed in a 3×3 array of virtual units in the virtual grid cell. In this embodiment, a code dot 16 is disposed at a lower middle position of the virtual grid cell to represent information to be regenerated from this two dimensional dot code. If the code dot 16 coincides with another one of the virtual code dots 20, the information to be regenerated from the two dimensional dot-code will be different from that of FIG. 2.

Figure 3:
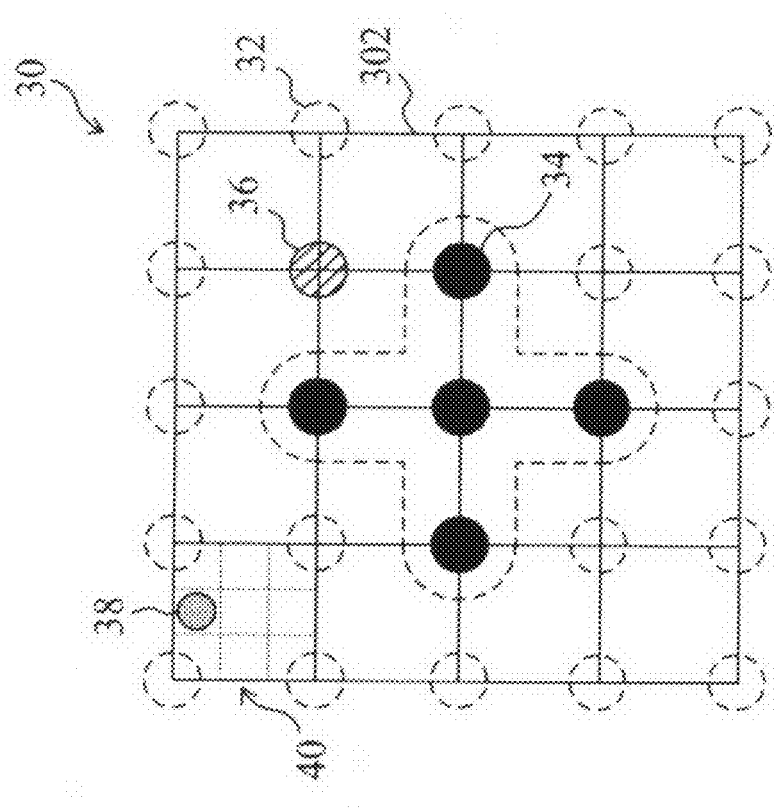
FIG. 3 is a schematic drawing of a two dimensional dot code according to the present invention.
Figure 4:
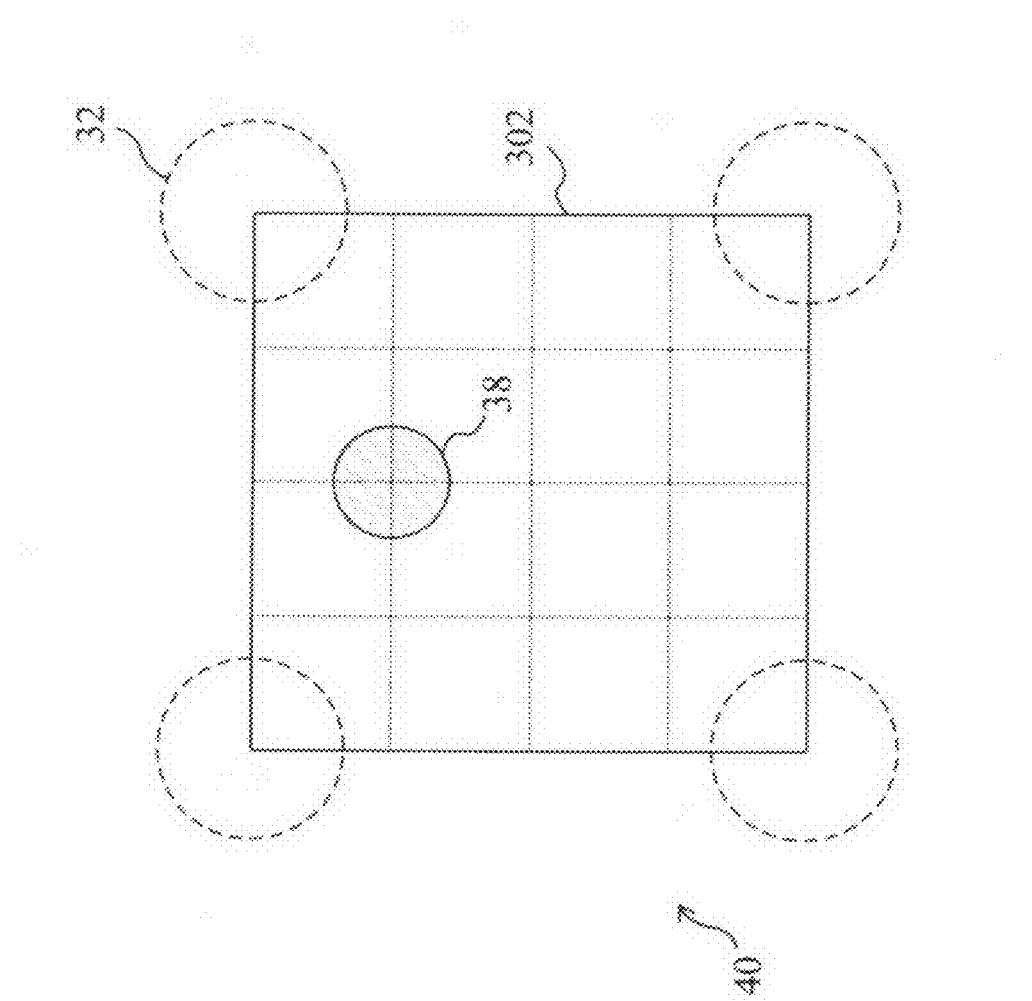
FIG. 4 is a schematic drawing of a code dot in another two dimensional dot code according to the present invention.

FIG. 3 is a schematic drawing of a two dimensional dot code according to the present invention. To decode this two dimensional dot code 30, an optical reader is used in scanning the two dimensional dot code 30 and producing an image thereof, and then the image is inputted into a decoding apparatus. The decoding apparatus begins by finding the cross formed of boundary dots 34, then determines the current direction of the two dimensional dot code 30 by virtue of a direction dot 36, and following that, calculates several virtual grid points 32 extending in all directions from the boundary dots 34 according to the positional relationship among the boundary dots 34. The virtual grid points 32 are connected by virtual grid lines 302 to form several virtual grid cells 40. The virtual grid points 32, grid lines 302 and grid cells 40 are not actual patterns in the two dimensional dot code 30 but are simulation results generated by the decoding apparatus. In this embodiment, code dots are distributed in an outer ring consisting of twelve said grid cells 40 in the two dimensional dot code 30, where each of the grid cells 40 is further divided into an 3×3, 4×4, or 5×5 array of virtual units. A code dot 38 may be located centrally at any of the virtual units, as shown in FIG. 3, or located at an intersection of partitioning lines of the virtual units in the grid cell 40, as shown in FIG. 4.

The embodiment shown in FIG. 3 can define more than $2^{36}$ codes. Besides, the code dots in this embodiment are scattered around the cross-forming boundary dots and therefore produce an evenly distributed two dimensional dot code pattern, which is inconspicuous and therefore suitable for being placed in a background. In addition, since only a small number of boundary and direction dots are used in this embodiment, the two dimensional dot code is recognizable even when an image thereof is taken slantingly or taken from a curved piece paper. Consequently, the dots are less likely to influence an original image of the two dimensional dot code, and the image taken only occupies a small space in a memory for storing such images. The coordinates can be calculated by extrapolation and interpolation, which significantly reduce the computations.

Figure 5:
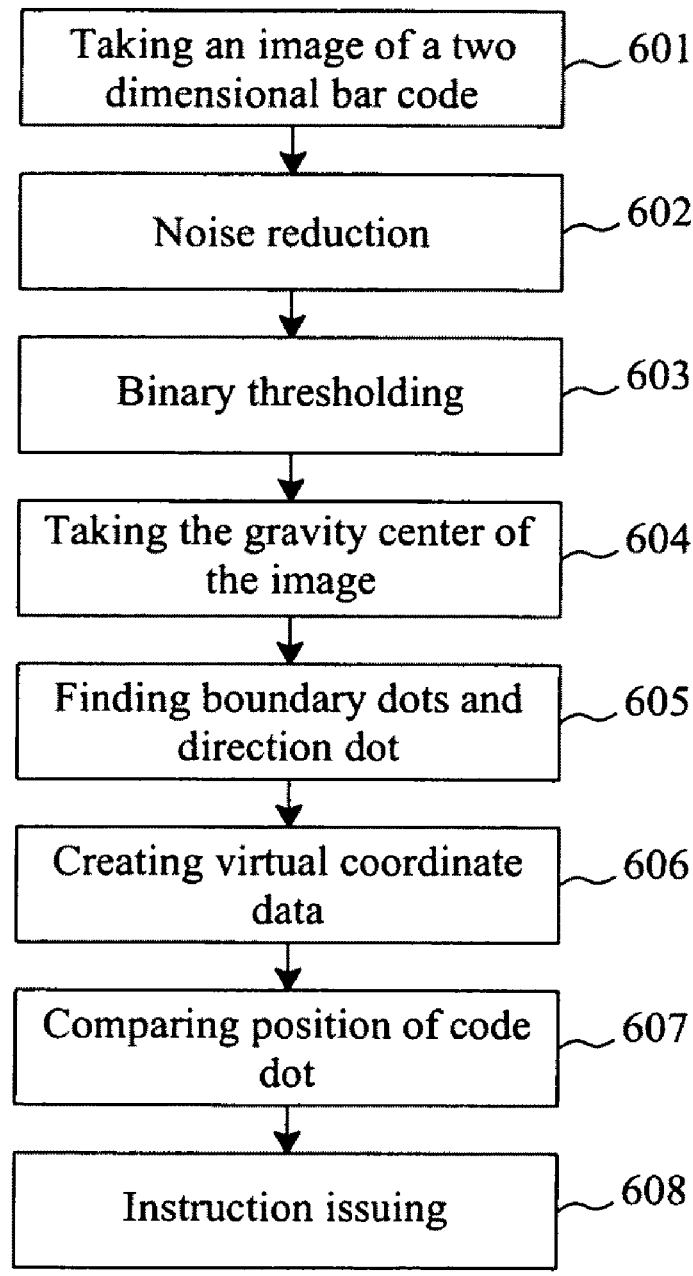
FIG. 5 is a flowchart to show a decoding process for a two dimensional dot code according to the present invention.

FIG. 5 is a flowchart to show a decoding process for a two dimensional dot code according to the present invention and is now explained with reference to the two dimensional dot code 30 shown in FIG. 3. In step 601 the two dimensional dot code 30 is scanned by an optical reader to generate an image, and then, in steps 602 and 603, a decoding apparatus, such as a computer having an image analyzing system, will pre-process the scanned image, including noise reduction and binary thresholding on the image sequentially, to remove shadows and noise resulting from the step 601. In step 604, the gravity center of the image is taken to determine the position of each dot in the image. In step 605, the boundary dots 34 and the direction dot 36 are found in the image. Next, virtual coordinate data are created in step 606, in which the direction of the two dimensional dot code 30 is determined according to the positional relationship between the boundary dots 34 and the direction dot 36, then the virtual grid points 32 extending in all directions from the boundary dots 34 are simulated according to a positional relationship, such as a spacing between the boundary dots 34, and following that, an origin of coordinates is defined, at a lower left vertex of the image for example, to facilitate subsequent calculation. Further in the step 606, coordinates of each of the virtual grid points 32 are calculated according to the boundary dots 34 and the direction dot 36. Afterwards, coordinates of each of the virtual code dots in each of the virtual grid cells 40 are calculated according to the coordinates of the virtual grid points 32. In step 607, the position of the code dot 38 are compared with the positions of the virtual code dots to rapidly determine the coordinates of the code dot 38, thereby obtaining the information to be regenerated from the two dimensional dot code 30. Finally, an instruction is issued in step 608, for instance, by which a corresponding data file will be retrieved from a database according to the information, and then the corresponding data file will be outputted in the form of sound, text, or image, by an output device.

With the decoding method according to the present invention, the position of a code dot can be determined without rotational correction for the scanned image, thereby simplifying the computations. Moreover, since the position of each dot is expressed in coordinates, positional relationship among the dots can be precisely determined to avoid misjudgment.

Figure 6:
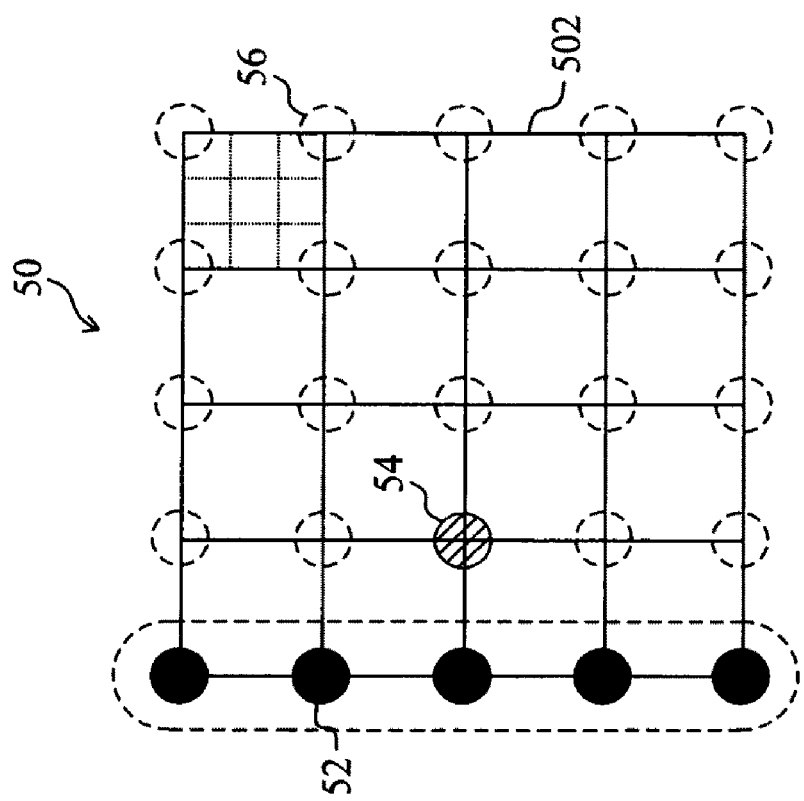
FIG. 6 is a schematic drawing of yet another two dimensional dot code according to the present invention.

FIG. 6 is a schematic drawing showing another embodiment according to the present invention, a two dimensional dot code 50 includes five linearly arranged boundary dots 52, and a direction dot 54 located to the right of the boundary dots 52. To decode this two dimensional dot code 50, virtual grid points 56 extending eastbound from the boundary dots 52 and virtual grid lines 502 are simulated according to the boundary dots 52 and the direction dot 54. Code dots are also distributed in a 3×3 array of virtual units in each of virtual grid cells.

Figure 7:
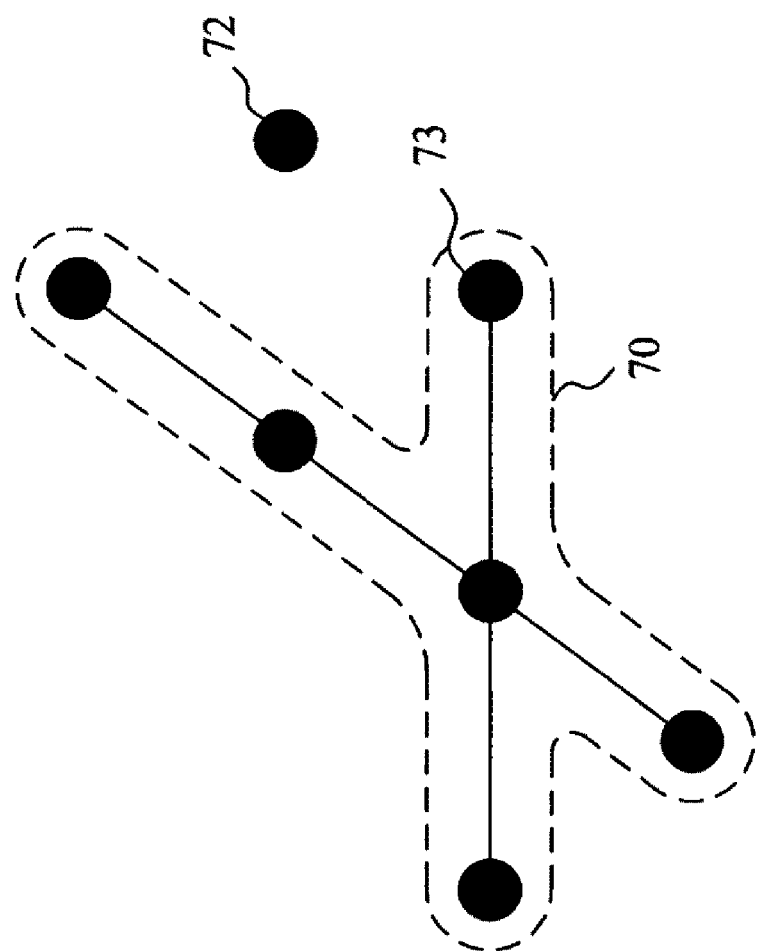
FIG. 7 is a schematic drawing of an alternative of the embodiment shown in FIG. 1.

FIG. 7 is an alternative of the embodiment shown in FIG. 1 and illustrates a cross 70 formed of more than five boundary dots 73. The cross 70 has two non-orthogonal bars. However, the direction of a two dimensional dot code containing the cross 70 can still be known by a direction dot 72.

Figure 8:
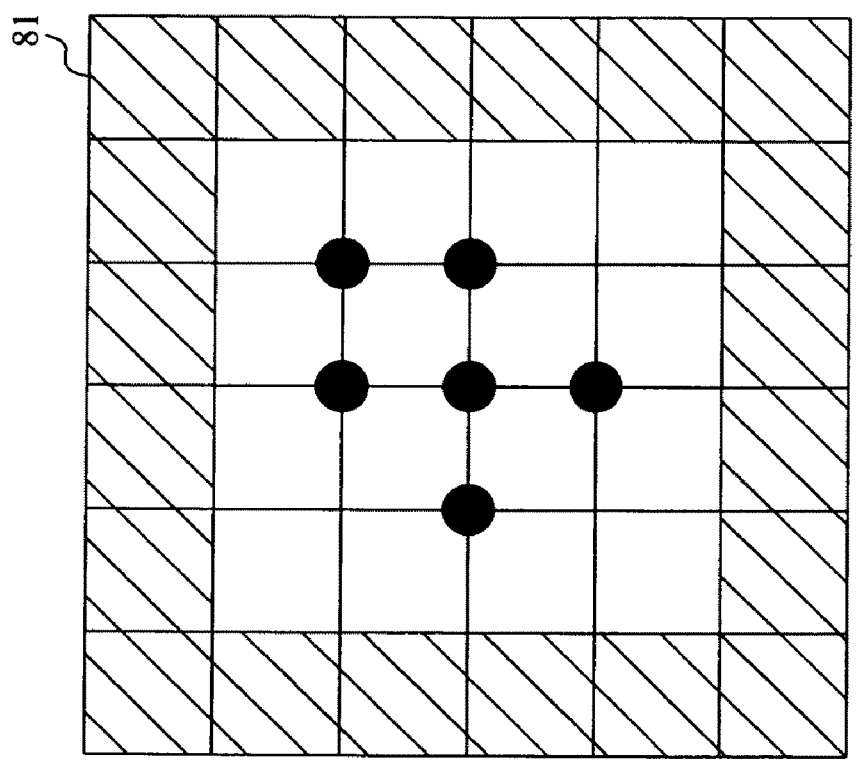
FIG. 8 is a schematic drawing of an alternative of the embodiment shown in FIG. 3.

FIG. 8 is an alternative of the embodiment shown in FIG. 3, in which a block of two dimensional dot code includes a ring of virtual grid cells 81 expanding further outwards from a cross formed of boundary dots, and is therefore capable of representing more information. More rings of virtual grid cells may be added as appropriate in other embodiments.

In conclusion, the present invention provides a two dimensional dot code and decoding apparatus and method for a two dimensional dot code, so that the positions of code dots in the two dimensional dot code can be rapidly and accurately determined without rotational correction for the image taken from the two dimensional dot code, thereby promptly decoding the two dimensional dot code.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A decoding method for a two dimensional dot code containing an information in an implicit manner and including a first and second plurality of boundary dots, a direction dot and a code dot, the decoding method comprising the steps of:
 determining a direction of the two dimensional dot code according to the boundary dots and the direction dot;
 creating coordinates of a plurality of virtual code dots according to the boundary dots;
 making a comparison between the code dot and the coordinates of the virtual code dots; and
 obtaining the information of the two dimensional dot code from a result of the comparison;
 wherein the first plurality of boundary dots is defined in a first linear arrangement, the second plurality of boundary dots is defined in a second linear arrangement, and the first linear arrangement crossing the second linear arrangement.

2. The decoding method of claim 1, wherein the step of creating coordinates of a plurality of virtual code dots according to the boundary dots comprises the steps of:
 defining a virtual origin of coordinates;
 defining coordinates of a plurality of virtual grid points according to the virtual origin of coordinates and the boundary dots; and
 creating the coordinates of the virtual code dots according to the coordinates of the virtual grid points.

3. The decoding method of claim 1, further comprising the steps of: obtaining a corresponding data according to the information of the two dimensional dot code; and outputting a sound, a word or an image according to the corresponding data.

4. A two dimensional dot code for regenerating an information, comprising:
 a first and second plurality of boundary dots defining a range of the two dimensional dot code and being arranged to create a plurality of virtual grid points forming a plurality of virtual grid cells and establishing a plurality of virtual code dots distributed in an array of virtual units in each of the virtual grid cells;
 a direction dot having a positional relationship with the boundary dots to define a direction of the two dimensional dot code; and
 at least one code dot representing the information and coinciding with one of the virtual code dots;
 wherein the first plurality of boundary dots is defined in a first linear arrangement, the second plurality of boundary dots is defined in a second linear arrangement, and the first linear arrangement crossing the second linear arrangement.

5. The two dimensional dot-code of claim 4, wherein the plurality of boundary dots comprises five boundary dots.

6. The two dimensional dot code of claim 4, wherein the plurality of boundary dots comprises six boundary dots.

7. The two dimensional dot code of claim 4, wherein the plurality of boundary dots have a spacing therebetween to define a spacing between the plurality of virtual grid points.

8. A decoding apparatus for a two dimensional dot code containing an information in an implicit manner and including a first and second plurality of boundary dots, a direction dot and a code dot, the decoding apparatus comprising:
 an image analyzing device for determining the boundary dots and the direction dot of the two dimensional dot code in an image produced by scanning the two dimensional dot code by an optical reader, calculating coordinates of a plurality of virtual code dots according to the boundary dots, and comparing the code dot with the virtual code dots to obtain the information;
 a memory storing a database; and
 a processor coupled to the memory to retrieve a corresponding data from the database according to the information;
 wherein the first plurality of boundary dots is defined in a first linear arrangement, the second plurality of boundary dots is defined in a second linear arrangement, and the first linear arrangement crossing the second linear arrangement.

9. The decoding apparatus of claim 8, further comprising an output device for outputting according to the corresponding data.

10. The decoding apparatus of claim 8, wherein the corresponding data has a form of text, sound or image.

11. A computer-readable media device for executing a process of decoding a two dimensional dot code containing an information in an implicit manner and including a first and second plurality of boundary dots, a direction dot and a code dot, the process comprising the steps of:
 determining a direction of the two dimensional dot code according to the boundary dots and the direction dot;
 creating coordinates of a plurality of virtual code dots according to the boundary dots;
 making a comparison between the code dot and the coordinates of the virtual code dots; and
 obtaining the information of the two dimensional dot code from a result of the comparison;
 wherein the first plurality of boundary dots is defined in a first linear arrangement, the second plurality of boundary dots is defined in a second linear arrangement, and the first linear arrangement crossing the second linear arrangement.

12. The media device of claim 11, wherein the step of creating coordinates of a plurality of virtual code dots according to the boundary dots comprises the steps of:
 defining a virtual origin of coordinates; defining coordinates of a plurality of virtual grid points according to the virtual origin of coordinates and the boundary dots; and
 creating the coordinates of the virtual code dots according to the coordinates of the virtual grid points.

13. The media device of claim 11, wherein the process further comprises the steps of:
 obtaining a corresponding data according to the information of the two dimensional dot code; and
 outputting a sound, a word or an image according to the corresponding data.

* * * * *